(12) United States Patent
Deluca et al.

(10) Patent No.: US 10,939,229 B2
(45) Date of Patent: Mar. 2, 2021

(54) COGNITIVE GEOFENCE BASED NOTIFICATION

(71) Applicant: International Business Machines Corporation, Armonk, NY (US)

(72) Inventors: Lisa Seacat Deluca, Baltimore, MD (US); Steve Mcduff, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 523 days.

(21) Appl. No.: 15/494,864

(22) Filed: Apr. 24, 2017

(65) Prior Publication Data
US 2018/0310123 A1   Oct. 25, 2018

(51) Int. Cl.
| G06Q 30/02 | (2012.01) |
| H04W 4/021 | (2018.01) |
| H04W 4/02 | (2018.01) |
| H04W 4/029 | (2018.01) |
| H04L 29/08 | (2006.01) |

(52) U.S. Cl.
CPC ............. *H04W 4/021* (2013.01); *H04L 67/22* (2013.01); *H04L 67/26* (2013.01); *H04L 67/306* (2013.01); *H04W 4/027* (2013.01); *H04W 4/029* (2018.02); *G06Q 30/0261* (2013.01); *G06Q 30/0267* (2013.01); *G06Q 30/0269* (2013.01)

(58) Field of Classification Search
CPC .................................................. G06Q 30/0261
USPC ...................................................... 705/14.58
See application file for complete search history.

(56) References Cited

U.S. PATENT DOCUMENTS

| 8,755,824 | B1 | 6/2014 | Wang et al. | |
| 9,595,049 | B2 | 3/2017 | Showers et al. | |
| 2008/0281687 | A1* | 11/2008 | Hurwitz | G06Q 30/02 705/14.1 |
| 2009/0012847 | A1* | 1/2009 | Brooks | G06Q 30/02 705/14.41 |
| 2012/0130796 | A1* | 5/2012 | Busch | G06Q 30/02 705/14.36 |
| 2014/0222562 | A1 | 8/2014 | Akgul et al. | |
| 2016/0196577 | A1* | 7/2016 | Reese | G06Q 30/0259 705/14.5 |
| 2016/0330583 | A1 | 11/2016 | Zises | |

FOREIGN PATENT DOCUMENTS

| WO | WO 2014089462 A2 | 6/2014 |
| WO | WO 2014207740 A1 | 12/2014 |

* cited by examiner

*Primary Examiner* — Azam A Ansari
(74) *Attorney, Agent, or Firm* — Stephanie Carusillo, Esq.; George S. Blasiak, Esq.; Heslin Rothenberg Farley & Mesiti P.C.

(57) ABSTRACT

Methods, computer program products, and systems are presented. The method computer program products, and systems can include, for instance: filtering in geofence users within an area of a geofence to determine a count of qualified in geofence users within an area of a geofence; comparing the count of qualified in geofence users within an area of a geofence to a threshold and activating a notification sending process based on a result of the comparing; based on the activating and outputting to the qualified users a notification based on the filtering; and disabling the notification sending process based on a disabling criteria being satisfied.

22 Claims, 8 Drawing Sheets

COGNITIVE GEOFENCE BASED NOTIFICATION

BACKGROUND

The present disclosure relates generally to advertising systems, and more specifically pertains to gathering or updating customer profile preferences by presenting a plethora of coupon selection choices and then using the gathered profiles to enable targeted, relevant, and/or personalized advertising.

Retailers have developed customer loyalty programs that allow customer profiles to be created for repeat customers. Customer profiles can include a wealth of information about the customer, including demographics, income levels, spending patterns, and purchasing preferences. Customer profiles are increasingly being recognized as key assets for retailers, as they are key elements in constructing targeted advertising campaigns and other forms of customer engagements, and also affect store merchandising plans and operations. Many retailers also offer coupons to customers. Although traditional coupon systems are considered effective in generating customer loyalty for the coupon clippers, they are largely underutilized as an information source for improving customer profiles. Improved customer profiles can lead to improved targeted advertising, yielding a more effective marketing tool, improving the ability to reach the right customers in a manner that they are willing to receive. Many prospective customers block unsolicited email and summarily discard what they consider to be junk mail. Retailers are therefore searching for ways to improve customer loyalty and targeting advertising programs though improved customer profiles.

SUMMARY

Shortcomings of the prior art are overcome, and additional advantages are provided, through the provision, in one aspect, of a method. The method can include, for example: filtering in geofence users within an area of a geofence to determine a count of qualified in geofence users within an area of a geofence; comparing the count of qualified in geofence users within an area of a geofence to a threshold and activating a notification sending process based on a result of the comparing; based on the activating and outputting to the qualified users a notification based on the filtering; and disabling the notification sending process based on a disabling criteria being satisfied.

In another aspect, a computer program product can be provided. The computer program product can include a computer readable storage medium readable by one or more processing unit and storing instructions for execution by one or more processor for performing a method. The method can include, for example: filtering in geofence users within an area of a geofence to determine a count of qualified in geofence users within an area of a geofence; comparing the count of qualified in geofence users within an area of a geofence to a threshold and activating a notification sending process based on a result of the comparing; based on the activating and outputting to the qualified users a notification based on the filtering; and disabling the notification sending process based on a disabling criteria being satisfied.

In a further aspect, a system can be provided. The system can include, for example a memory. In addition, the system can include one or more processor in communication with the memory. Further, the system can include program instructions executable by the one or more processor via the memory to perform a method. The method can include, for example: filtering in geofence users within an area of a geofence to determine a count of qualified in geofence users within an area of a geofence; comparing the count of qualified in geofence users within an area of a geofence to a threshold and activating a notification sending process based on a result of the comparing; based on the activating and outputting to the qualified users a notification based on the filtering; and disabling the notification sending process based on a disabling criteria being satisfied.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
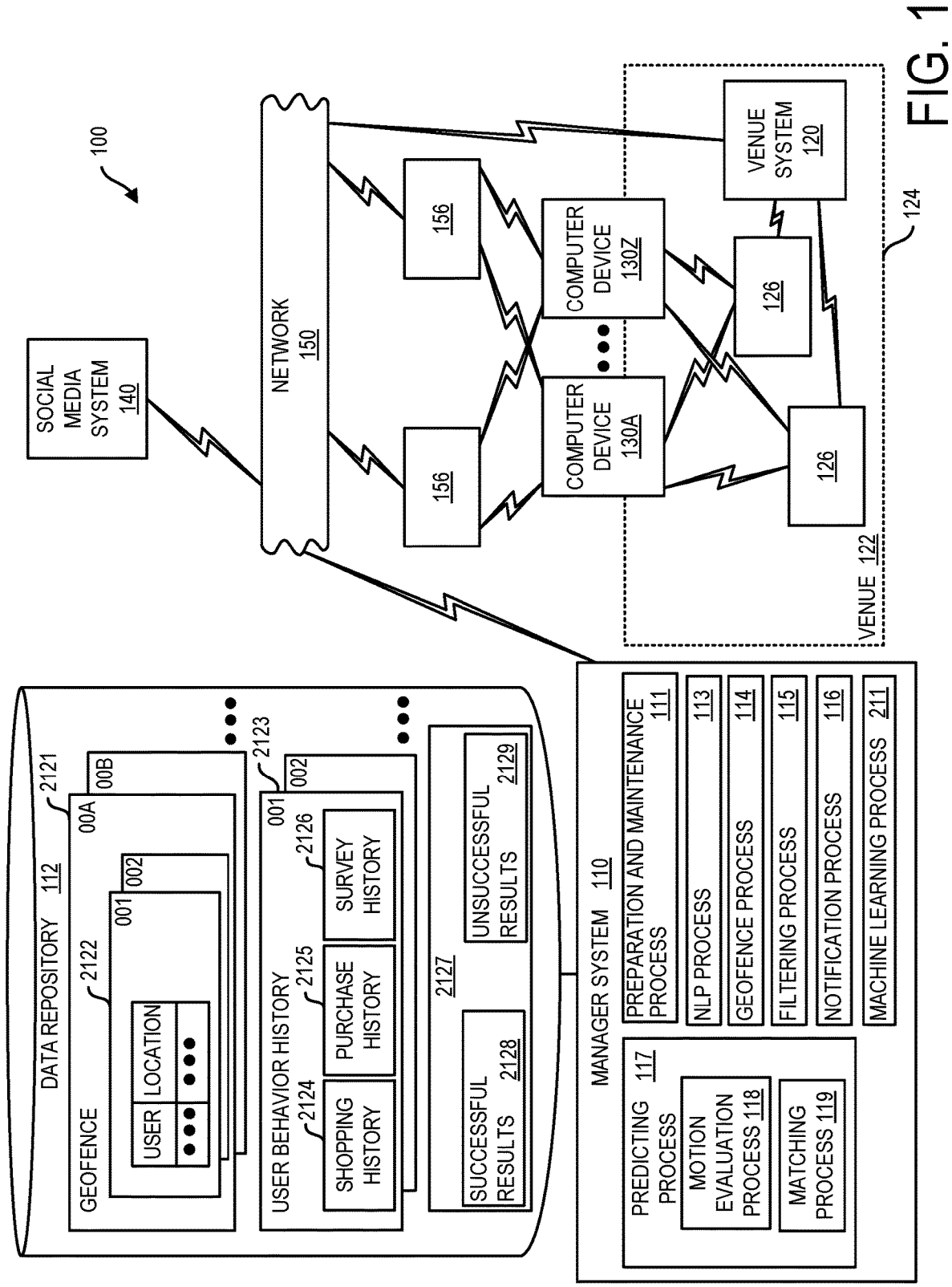
FIG. 1 depicts a system having manager system and a social media system in one embodiment.

System 100 for use in providing notifications is shown in FIG. 1. System 100 can include manager system 110 having an associated data repository 112, venue system 120, a plurality of user computer devices 130A-130Z, and social media system 140. Manager system 110, venue system 120, computer devices 130A-130Z, and social media system 140 can be in communication with one another via network 150. System 100 includes numerous devices, which may be computing node based devices, connected by a network 150. Network 150 may be a physical network and/or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

In one embodiment manager system 110 can be external to venue system 120 social media system 140 and to each of the one or more user computer device 130A-130Z. In one embodiment manager system 110 can be co-located with venue system 130 social media system 140 or another social media system. In one embodiment manager system 110 can be co-located with one or more user computer device 130A-130Z.

Referring further to FIG. 1, venue system 120 can be located in venue 122 that is delimited by venue geographical border 124 that specifies the geographical coordinate area occupied by venue 122. In one embodiment, an organizational entity that operates manager system 110 can be in common with the organizational entity that operates venue system 120 and venue 122. Venue 122 can be a retail venue in one embodiment. Venue system 120 can be disposed in venue 122 defined by geographical boundary 124. Computer devices 130A-130Z can be mobile computer devices, moveable between locations, internal and external to venue 122, and thus are shown in FIG. 1 as being partially disposed within geographical boundary 124 and partially disposed external to geographical boundary 124. Computer devices 130A-130Z can be wireless computer devices that can be connected to network 150 by alternative radio communication protocols. For example, computer devices 130A-130Z can connect to network 150 by connection nodes 156. Connection nodes 156 can be connection nodes that facilitate connection to a cellular communication network. Computer devices 130A-130Z can also be connected to network 150 via connection nodes 126. Connection nodes 126 can be provided by IEEE 802.11 access points of a WIFI wireless network provided by an operator of venue system 120, in which operator can be the operator of venue 122 and manager system 110.

In one embodiment, each computer device 130A-130Z can be associated to a certain user. In one embodiment, each user of system 100 is a registered user of a retail vendor that operates a plurality of venues such as venue 122. Users having records stored in area 2123 of data repository 112 can be registered users of manager system 110 and of the vendor e.g. can be customer loyalty card holders of the vendor who receive customer loyalty cards in exchange for data regarding themselves.

Each of the different users of computer devices 130A-130Z can be associated to a different user. Regarding one or more user computer device 130A-130Z, a computer device of one or more user computer device 130A-130Z in one embodiment can be a computing node device provided by a client computer, e.g. a mobile device, e.g. a smartphone or tablet, a laptop or PC that runs one or more program including a web browser for browsing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system.

Embodiment herein recognize that a variety of a variety of problems arise in the realm of computer networks operating in an area occupied by a plurality of users capable of communicating with a network. Embodiments herein recognize that on the occurrence of events commonly experienced by multiple users at a common time, the multiple users may make concurrent demands on the network to overload the network and frustrate the function of relied on services. Embodiments herein recognize that on outputting of notifications by the network to multiple users traffic patterns can be affected in significant ways giving rise to health risks, safety risks, and infrastructure building layout designed concerns.

Manager system 110 can run various processes including preparation and maintenance process 111, Natural Language Processing (NLP) process 113, geofence process 114, filtering process 115, notification process 116, and predicting process 117, which can run sub-processes including, motion evaluation process 118, and matching process 119. Manager system 110 can alson run machine learning process 211.

Manager system 110 can run preparation and maintenance process 111 to populate and maintain data of data repository 112 for use by various processes run by manager system 110 including e.g. geofence process 114 notification process 116 and its sub-processes, motion evaluation process 118 and matching process 119.

Manager system 110 can run NLP process 113 to process data for preparation of records that are stored in data repository 112 and for other purposes Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameter can include topic segmentation to identify several topics within a message. Topic analysis can apply a variety of technologies e.g. one or more of hidden mark model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." In one embodiment, determining sentiment can include use of a scaling system whereby words commonly associated with having a negative, neutral or positive sentiment with them are given an associated number on a −10 to +10 scale (most negative up to most positive). Accordingly, it can be possible to adjust the sentiment of a given term relative to its environment (usually on the level of the sentence). When a piece of unstructured text is analyzed using natural language processing, each concept in the specified environment can be given a score based on the way sentiment words relate to the concept and its associated score. Accordingly, it can be possible to adjust the sentiment value of a concept relative to modifications that may surround it. Words, for example, that intensify, relax or negate the sentiment expressed by the concept can affect its score. Alternatively, text can be given a positive and negative sentiment strength score if the goal is to determine the sentiment in a text rather than the overall polarity and strength of the text. Performing sentiment analyses can include use of knowledge based techniques, statistical methods, and/or hybrid approaches. Knowledge-based techniques classify text by affect categories based on the presence of unambiguous affect words such as "happy", "sad", "afraid", and "bored". Some knowledge bases not only list obvious affect words, but also assign arbitrary words a probable "affinity" to particular emotions. Statistical methods can leverage elements from machine learning such as latent semantic analysis, support vector machines, "bag of words," semantic orientation, and pointwise mutual information. More sophisticated methods can detect the holder of a sentiment (i.e., the person who maintains that affective state) and the target (i.e., the entity about which the affect is felt). To mine the opinion in context and obtain the feature which has been opinionated, the grammatical relationships of words can be used. Grammatical dependency relations are obtained by deep parsing of the text. Hybrid approaches can leverage both machine learning and elements from knowledge representation such as ontologies and semantic networks in order to detect semantics that are expressed in a subtle manner, e.g., through the analysis of concepts that do not explicitly convey relevant information, but which are implicitly linked to other concepts that do explicitly convey relevant information.

Manager system 110 can run geofence process 114 to determine the count and identifiers for users currently in an instantiated geofence. Manager system 110, in one embodiment can instantiate geofences at or about retail venues. Manager system 110 in one embodiment can run filtering process 115 to determine whether users within a geofence are qualified users and can run filtering process 115 to determine a count of qualified users within a geofence. Manager system 110, in one embodiment can monitor the count of qualified users within an area of a geofence and based on determining the count of qualified users within an area of a geofence has exceeded a threshold, can activate notification process 116. For running filtering process 115, manager system 110 can evaluate various criteria, e.g. demographic criteria and/or can run predicting process 117.

For running predicting process 117, manager system 110 can run motion evaluation process 118 and matching process 119. Manager system 110 can run predicting process 117 for predicting that users will respond in a targeted way to receipt of a notification. Manager system 110 for running predicting process can run motion evaluation process 118 and matching process 119.

In accordance with machine learning process 211, manager system 110 can examine results obtained by performance of predicting process 117 and based on the examining can adjust predicting process 117. Manager system 110 can run notification process 116 to manage the outputting of notifications to various users. Data repository 112 can include geofence area 2121 which can include history data on a variety of instantiated geofences e.g. geofence 00A, 00B, and numerous additional geofences. For each instantiated geofence there can be stored a plurality of time records as indicated by time records area 2122. For each of several time records there can be recorded in a table associating users and their respective location coordinates for the specific point in time. Thus, by examining time records for a particular instantiated geofence manager system 110 can track a speed and motion pattern for a particular user.

Data repository 112 can also include user behavior history area 2123 which can store data on the behavior history of each of a plurality of users e.g. user 001, user 002, and a plurality of additional users. User behavior history area 2123 can include shopping history area 2124, purchase history area 2125, and survey history area 2126. In shopping history area 2124 of behavior history area 2123, there can be stored a plurality of shopping history records. Each record specifying a prior shopping history activity of the user, e.g., web browsing history of the user can be stored in shopping history area. In area 2125, there can be stored records of purchase histories records of purchases by the user. Each record can specify information of a different purchase by the user. In survey history area 2126, there can be stored records of surveys completed by the user. Shopping history data stored in area 2124 can include a record of a customer's shopping behavior e.g. data on whether the customer tends to shop online or in retail venues and the amount of times associated with online or in-store shopping. For example, in shopping history area 2124 there can be stored data records indicating the average time which a customer maintains an online browsing session and/or data that indicates the average length of time that a customer remains in a retail venue after arrival at a retail venue, and data records indicating cost and types of product browsed either on-line or in venue, and data records indicating breaches of beacon zones 129 of a venue 122. Topics for products subject to shopping activity can be extracted by running of NLP process 113 and associated to data records stored in area 2124. Data of purchase history area 2130 can include a record of purchases that the customer has made over time and include various sub-classifications relating e.g. to cost and types of products purchased. Topics for products purchased can be extracted by running of NLP process 113 and associated to data records stored in area 2125. In area 2131 there can be stored survey history data e.g. can store records of surveys that have been completed in the past by the customer over time regarding preferences of the customer e.g. likes and dislikes. Topics for products commented on in surveys can be extracted by running of NLP process 113 and associated to data records stored in survey history area 2126.

Figure 2:
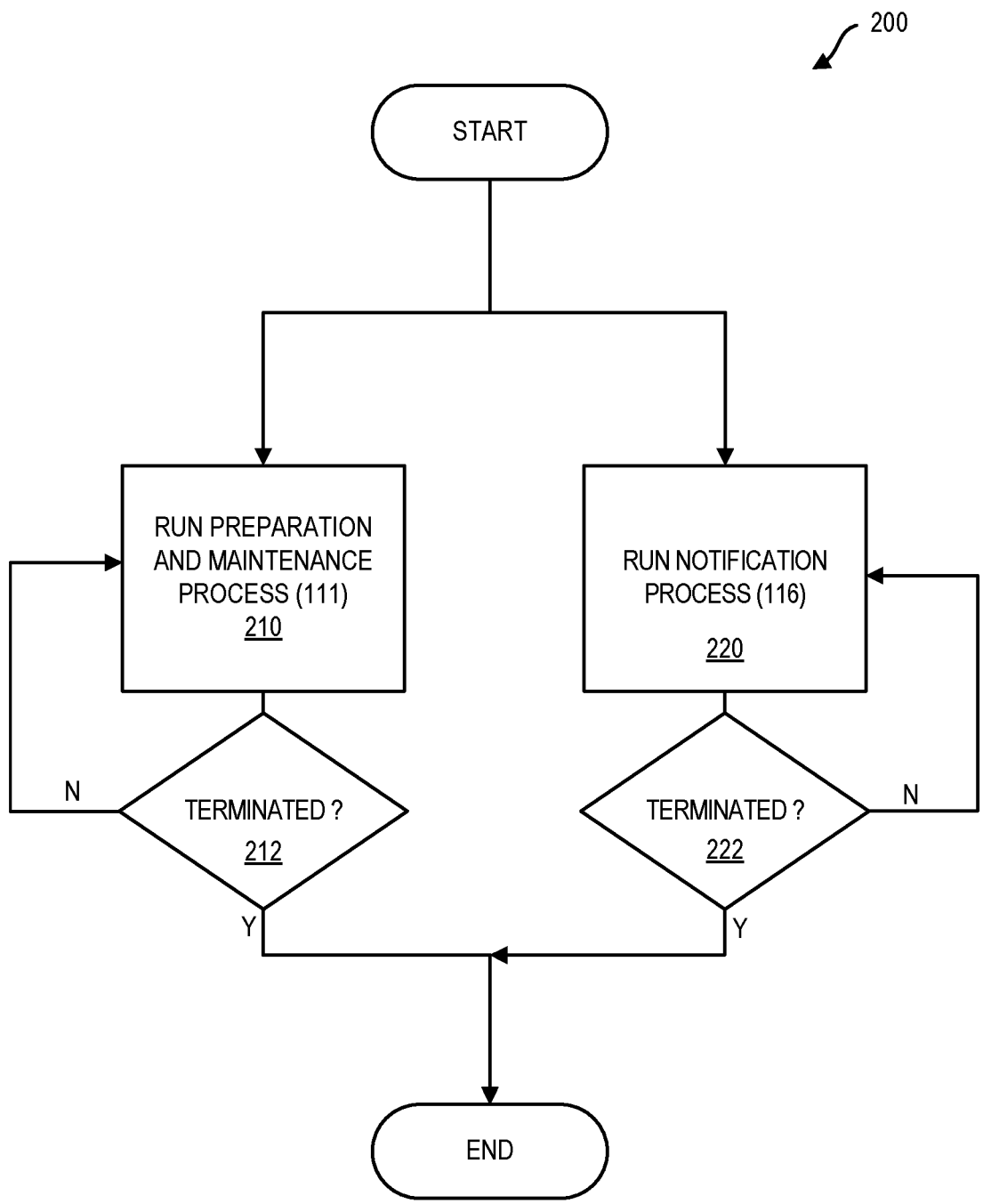
FIG. 2 depicts a flowchart illustrating coordination of processes that can be performed by a manager system in one embodiment.

FIG. 2 depicts a flowchart of illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of geofence area 2121 shopping history area 2124 purchase history area 2125 and survey history area 2126. Manager system 110 can run preparation and maintenance process 111 until process 111 is terminated at block 212.

At block 220, manager system 110 can run notification process 116 to output one or more notification to one or more user. For support of running of notification process 116 iteratively, manager system 110 can be running e.g. geofence process 114, filtering process 115, and predicting process 117 iteratively. Manager system 110 can output notifications iteratively in the performance of a notification process 116, and manager system 110 can run more than one notification process concurrently. Manager system 110 can run notification process 116 until notification process 116 is terminated at block 222. Manager system 110 can run preparation and maintenance process 111 and notification process 116 concurrently and can run each of process 111 and process 116 iteratively.

For performance of preparation and maintenance process 111, manager system 110 can be configured to automatically process, e.g. including by running of NLP process 113, messages that are generated by system 100. In one embodiment manager system 110 for performance of block 210 can instantiate structured data records in areas 2121-2126 that are adapted for use by notification process 116.

For instantiation of records into geofence area 2121 manager system 110 can monitor data messages output by location services of system 100, e.g. within or external to venue specific geofences according to venue geographical border 124.

For instantiation of records into user behavior history areas 2124, 2125, and 2126 manager system 110 can be configured so that manager system 110 automatically monitors for "activities" of a customer user and stores an activity record for each activity in one or more of area 2124, 2125, and 2126. An activity can be a shopping activity e.g. a browsing session on a venue website or an in venue visit. Records for such activities can be stored in area 2124. Activities can include purchases e.g. on line or in venue. Records for such activities can be stored in area 2125. Activities can include completed surveys which can completed on line. Records for such activities can be stored in area 2126. A record for an activity instantiated by manager system 110 can include e.g. a Customer ID, ID=001, and classification information return by subjecting a message generated by performance of the activity to NLP processing by running of NLP process 113, e.g. topic and/or sentiment classifications of generated messages. Data repository 112 can store such activity records in addition to or in place of underlying unstructured message content. In one embodiment, data repository 112 can be configured to initialize responsively to being populated with a threshold amount of data having specified attributes.

Figure 3:
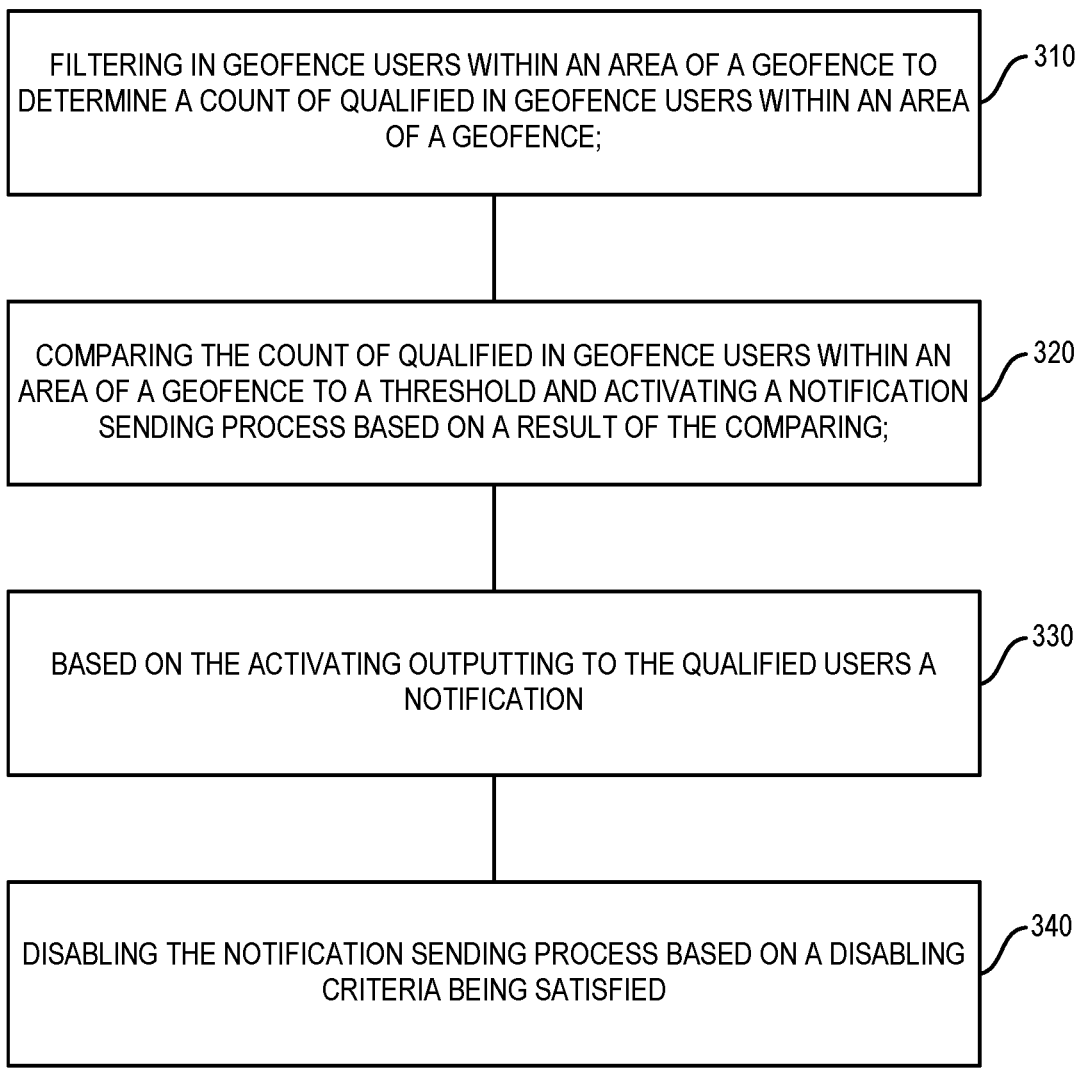
FIG. 3 depicts a flowchart illustrating a method for performance by a manager system.

A method 300 for performance by manager system 110 is illustrated with reference to FIG. 3. At block 310, manager system 110 can perform filtering in geofence users within an area of a geofence to determine a count of qualified in geofence users within an area of a geofence. At block 320, manager system 110 can perform comparing the count of qualified in geofence users within an area of a geofence to a threshold and activate a notification process e.g. notification process 116, based on a result of the comparing. At block 330, manager system 110 can perform outputting to the qualified users a notification. At block 340, manager system 110 can perform disabling the notification sending process based on a disabling criteria being satisfied.

Manager system 110 at block 310 can determine whether users within an area of a geofence are qualified users who are qualified to receive a notification. Manager system 110 at block 320 can compare a count of qualified users to determine that a low threshold is exceeded. For example, a notification process can be activated to output a notification that is not output unless there is an expected amount of permeation of message associated with a notification. Manager system 110 at block 320 can activate a notification process e.g. notification process 116, based on a low threshold being exceeded, which can be indicative e.g. of there being sufficient users to achieve a goal of a notification process. Manager system 110 at block 320 can compare a count of qualified users to determine that a count is less than a high threshold. Manager system 110 can active a notification process based on a count being less than a high threshold, which can be indicative e.g. of there being reason to adjust activities of users by notification. Manager system 110 at block 310 can compare a count of qualified users to a low threshold and a high threshold and can activate a notification process based on a count of users exceeding a low threshold and being below a high threshold. Manager system 110 at block 310 in one embodiment for performing filtering, can perform predicting that certain users of the in geofence users will perform a defined activity in response to receipt of a notification.

Figure 4:
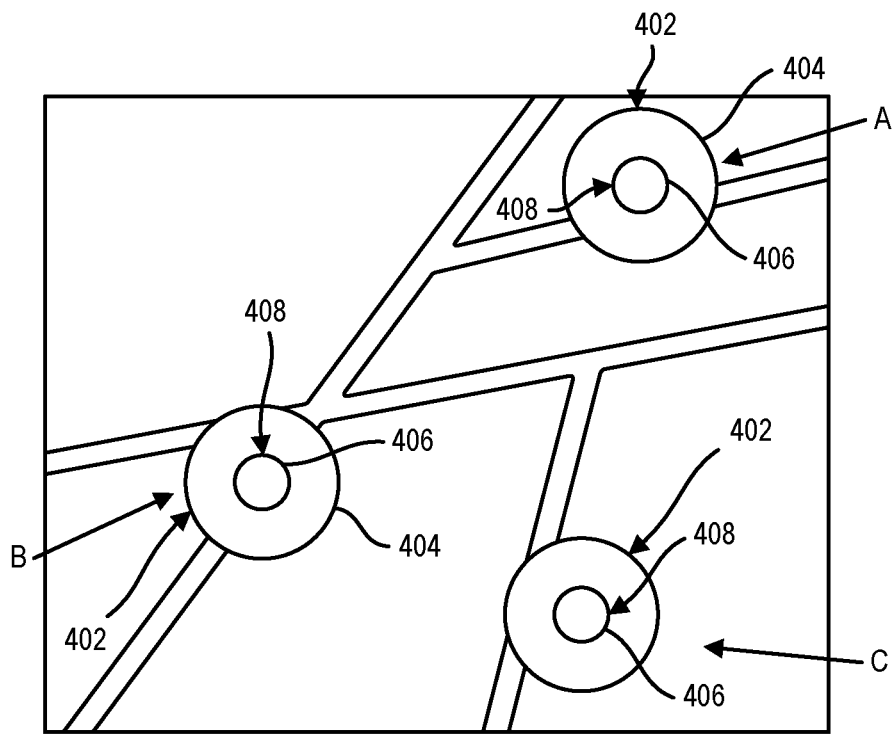
FIG. 4 shows a representation of a geographical area and geofences defined therein.

Manager system 110, which can be operated e.g. by a venue proprietor that operates several venues, can instantiate a plurality of geofences representing geographical areas of interest described with reference to FIG. 4 showing a representation of a geographical area and geofences defined for areas therein e.g. geofences at location A, geofences at location B, and geofences at location C. At each location, e.g. location A there can be instantiated a plurality of geofences e.g. an outer area geofence 402 and inner area geofence 408. Outer area geofence 402 at each location, A, B, and C can be delimited by outer perimeter 404. Inner area geofence 408 at each location, A, B, and C can be delimited by inner perimeter 406 and include an entirety of the area within a perimeter interior to and within inner perimeter 406. Outer area geofence 402 can include the area within outer perimeter 404. Manager system 110 can intelligently instantiate geofences at locations A, B, and C. In one embodiment, inner area geofence 408 can be instantiated to specify the geographic boundary of a retail venue such as retail venue 122 as shown in FIG. 1. Thus, inner area geofence 408 can specify the area of a retail venue geographical boundary 124 as described with reference to FIG. 1. Outer area geofence 402 can be instantiated at surrounding areas around the specific area of venue corresponding to the area of inner area geofence 408. Outer area geofence 402 can be defined by an outer perimeter 404 spaced apart from inner perimeter 406. Outer area geofence 402 can be instantiated to identify candidate users who might receive a notification e.g. notifications to encourage the users to travel from their location within outer area geofence 402 and external to an area of inner area geofence 408 into the area of inner area geofence 408. In one embodiment, manager system 110 at block 310 can activate a notification sending process based on the count of in geofence users exceeding a threshold and/or being below a threshold, the in geofence users being users within outer area geofence 402. In one embodiment, rules can be applied so that the notification sending process of block 310 is not activated on certain conditions, even though the qualifying number of users within the outer area geofence 402 are present based on one or more threshold. In one embodiment, manager system 110 in accordance with method 300 can be operative to activate a notification sending process at block 320 for purposes of sending notifications e.g. to prompt users to move from their location external to inner area geofence 408 into and within the area of inner area geofence 408. However, in some circumstances the area of inner area geofence 408 might be significantly crowded e.g. there are a sufficient number of users currently at retail venue 122. Thus, in one embodiment activating at block 320 can be based on determining that a qualifying count of qualified in geofence users are within an area of a geofence i.e. outer area geofence 402, wherein determining whether a user is a qualified user can include running of filtering process 115. Manager system 110 at block 310 can perform filtering process 115 and can examine various qualifying criteria e.g. location based position criteria or demographic based criteria. Regarding the highlighted example of a qualifying criteria being a location based criteria a user can be qualified as a qualified user if the user is within the area of outer area geofence 402, but not the area of inner area geofence 408 (e.g. indicating the user is already in the venue). According to a demographic based criteria a promotional campaign can be based e.g. on gender (e.g. only to women or another demographic based on defining demographics e.g. age group, etc.).

In another aspect, manager system 110 at block 310 for performing filtering to determine whether a user is a qualified user can perform predicting that certain users of the in geofence users will perform a defined targeted activity in response to receipt of a notification.

In one embodiment, such predicting can include predicting that a sending of a certain notification to a user within an area of a geofence 402 targeted to prompt a user to perform a defined targeted activity will successfully prompt the recipient user to perform the defined targeted activity. In one embodiment, the defined activity can be the activity to travel from an area within outer area geofence 402 and external to inner area geofence 408 to an area of inner area geofence 408 at the location of a retail venue 122. In one embodiment, the predicting can be based on a current pattern of motion of the user. For example, if the user is exhibiting the pattern of rushing through an area external to inner area geofence 408 and within outer area geofence 402, manager system 110 can determine that such user may not be susceptible to being swayed by a notification. Similarly if the user is currently moving directly toward inner area geofence 408, or is already within an area of inner area geofence 408 and the notification is a notification prompting movement to geofence 408 manager system 110 can also determine that the notification is not likely to influence the current action of a user. Filtering by predicting at block 310 in one embodiment can include predicting that a notification will alter the action that the user would have taken or will take if the user does not receive the notification. Manager system 110, performing filtering by predicting at block 310 can perform predicting based on a motion pattern and can also perform predicting based on a history of behavior of a user. For example, a notification for sending can have a certain characteristic e.g. a topic, manager system 110 in one embodiment, at block 310 can perform predicting that a user within the area of the inner area geofence 408 will perform a defined activity e.g. travelling to inner area geofence 408 based on a behavior history of the user matching the topic of the notification for sending. Manager system 110, for example, at block 310 can predict based on a behavior history of a user that a user will be swayed if prompted by a notification to travel to the area of inner area geofence 408. If the notification specifies a promotion related to "coffee" and the user's behavior history includes a threshold percentage of records related to coffee indicating that the user likes coffee and thus is likely to be swayed if prompted by the notification.

For performance predicting at block 310 in one embodiment, manager system 110 can apply Equation 1 as is set forth herein below.

$$P = W1F1 + W2F2 + W3F3 + W4F4 \quad \text{(Equation 1)}$$

Where "P" is the overall probability that a user within outer area geofence 402 and external to inner area geofence 408 will be prompted by a notification defining and specifying the activity for travelling to the location defined by inner area geofence 408. "F1-F4" are factors for predicting that a user will be prompted by a notification to travel to inner area geofence 408 from an area external to inner area geofence 408 and within outer area geofence 402. "W1-W4" are weights associated with the various factors "F1-F4." In one embodiment "F1" can be the probability that a user is prompted by a notification to travel to inner area geofence 408 based on a motion pattern of the user, "F2" is a measure of the probability of the user travelling to inner area geofence 408 based on first behavior history data of the user, "F3" is a measure of the probability of the user being prompted by a notification to travel to inner area geofence 408 based on second behavior history data of the user, and "F4" is a measure of the probability of the user travelling to inner area geofence 408 from an area external to inner area geofence 408 and within outer area geofence 402 based on a third behavior history data of the user. Manager system 110 according to Equation 1 can combine the various factors, "F1-F4," by applying weights to the factors and summing the weighted factors. During iterations of the performance of predicting using Equation 1 manager system 110 can vary the weights "W1-W4," within predefined ranges and over time according to machine learning process 211, can examine results output by system 100 to adjust the weights "W1-W4." Manager system 110 can determine a probability according to each factor that a targeted activity will result from a notification, e.g. expressed on a scale of 0.00 (zero probability) to 1.00 (100% probability) and can weight and sum the various factors. Manager system 110 can perform predicting at block 310 that a user will be prompted to perform a defined activity where an overall probability that the activity will be prompted exceeds a threshold, e.g. a predetermined threshold or a dynamic threshold.

Referring again to Equation 1, behavior history factor "F2" can be a behavior history factor based on data stored in shopping history area 2124 of data repository 112, behavior history factor "F3" can be a behavior history factor based on data stored in purchase history area 2125 of data repository 112, and behavior history factor "F4" can be a behavior history factor based on data stored in survey history area 2126 of data repository 112. By adjusting weights "W1-W4" over time in accordance with the results obtained by the predicting manager system 110 can tune the predicting in favor of factors determined over time by examining output data to be the factors that best predict whether a user will be swayed if prompted by a notification. At block 330 manager system 110 can perform outputting a notification.

At block 340, manager system 110 can perform disabling the notification sending process based on disabling criteria being satisfied. In one embodiment, the disabling criteria being satisfied can be the criteria that a sufficient number of qualified users are now located within the area of inner area geofence 408 e.g. within venue 122 defined by border 124 (FIG. 1). A goal of notification sending in one embodiment can be attracting users into a retail venue, such as retail venue 122. That goal may be determined to be satisfied by the observation that the threshold number of users are now located within inner area geofence 408. For disabling the notification sending process at block 330, manager system 110 can deactivate the notification sending process in one embodiment which can encompass deactivating performing predicting at block 310. In another embodiment, disabling the notification sending process at block 340 can include manager system 110 restricting the sending notifications so that notifications are not sent to users, even users predicted to be prompted to perform a defined activity by a notification.

Figure 5:
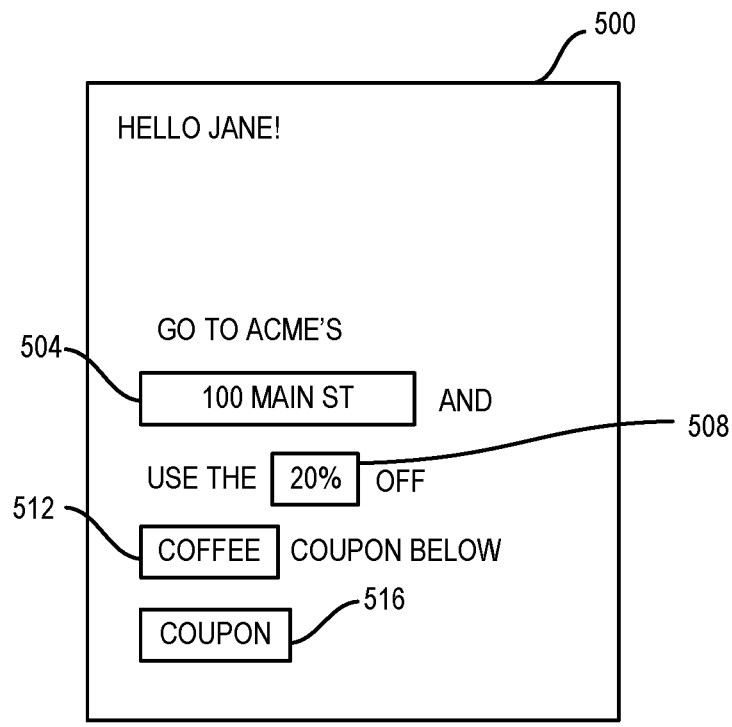
FIG. 5 depicts a user interface for display on a user computer device illustrating an exemplary embodiment.

FIG. 5 is a user interface 500 for display on a user computer device 130A-130Z, illustrating an exemplary embodiment of manager system 110 outputting a notification to a user. User interface 500 can be displayed on a display of a computer device 130A-130Z. In one embodiment user interface 4500 can be provided by a webpage form served by a webserver of manager system 110. A user using user interface 500 can use area 501 of user interface 500 to perform registration processes that facilitate registration of a user as a registered user of manager system 110. Manager system 110 can be operated by a retailer that operates a plurality of venues such as venue 122 (FIG. 1) and venue systems 120 located in venues 122. By registration into manager system 110 as a registered user, a user can receive certain benefits e.g. discounts and other customer satisfaction and support services. In exchange the retailer can receive e.g. rights to obtain data of the user which can store in data repository 112 in a manner as set forth herein. In registration area 501 a user may be prompted to enter various contact information including e.g. e-mail addresses and social media accounts and may also be prompted to provide permission to manager system 110 to contact the user using any number of mediums, e.g. cellular service text-based messages, e-mail messages, social media accounts. For providing a notification to a user at block 320, manager system 110 can out put a notification using one or more of the mediums permitted by the user and thus the user interface 500 as set forth in FIG. 5 can be displayed via any one of a number of communication mediums e.g. cellular service communications, e-mail communications, and social media communications. In area 502 of user interface 500, user interface 500 can display a notification message e.g. a text-based notification message, the message in the disposed embodiment can include the message, "GO TO ACME's AT 100 MAIN STREET AND USE THE 20% OFF COFFEE COUPON BELOW." In area 504, user interface 500 can display variable data indicating the location of inner area geofence 408 which specifies the location of a retail venue in one embodiment. In area 508, there is a displayed variable data indicating a savings parameter associated with the promotion. In area 512, user interface 500 can display variable data indicating products or services associated with the promotion. In area 516, user interface 500 can display a coupon for presentation included with the notification. In one embodiment, manager system 110 can be configured to process e.g. using NLP process 113 any custom configured notification that can be custom configured by an administrator of manager system 110 e.g. for example, on specifying a custom notification NLP process 113 can process the notification to determine classifications of the notifications e.g. topic classifications which manager system 110 can use for matching with topic classifications performed with respect to behavior history data records of a user in the performance e.g. a predicting process 117.

Figure 6:
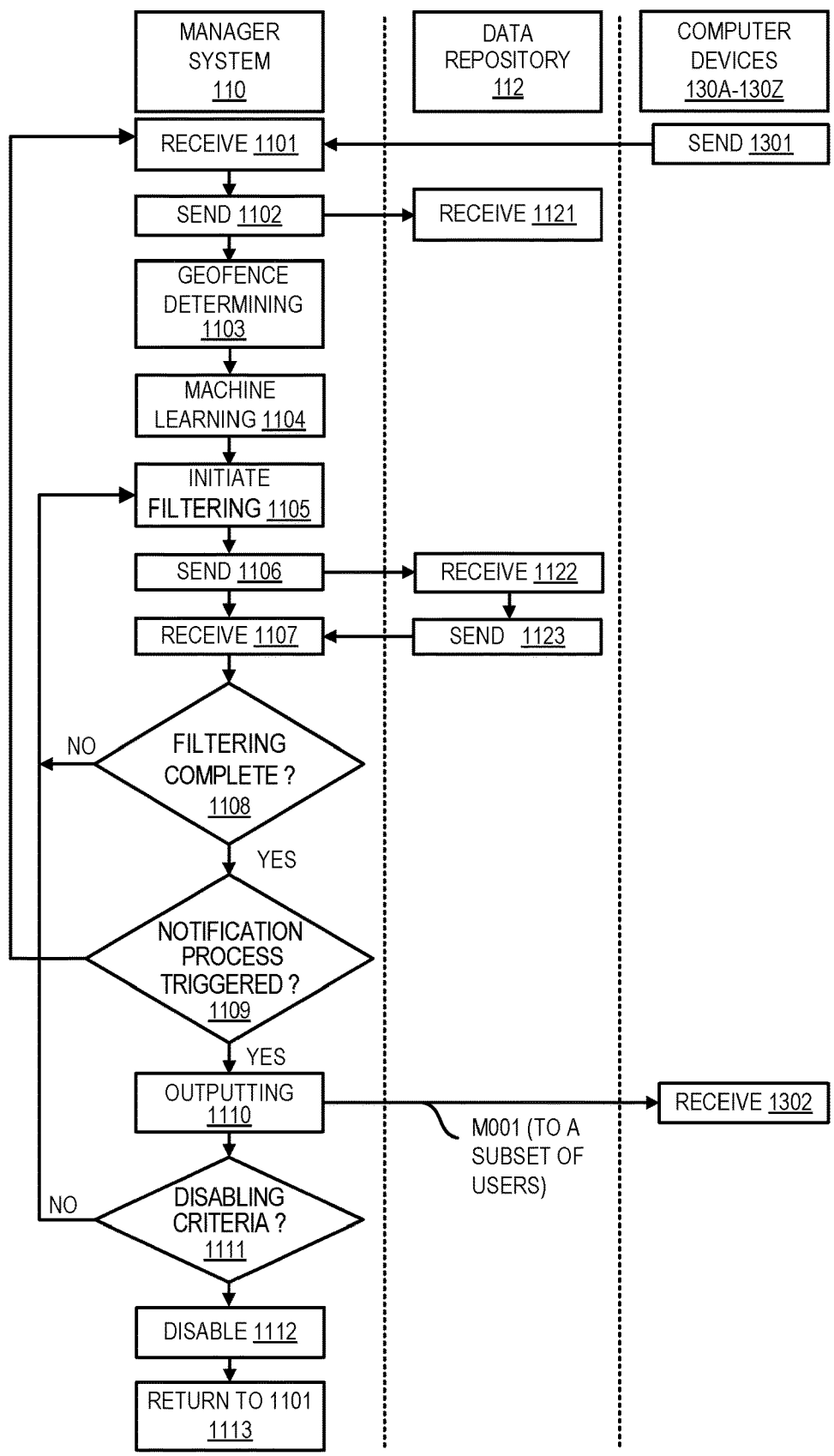
FIG. 6 depicts a flowchart illustrating a method.

A specific example of method 300 is set forth in reference to the flowchart of FIG. 6 illustrating a specific example of method 300. From the perspective of manager system 110, data repository 112, and user computer devices 130A-130Z.

At block 1310, computer devices 130A-130Z can send location data for receipt by manager system 110 at block 1101. The sending of location information at block 1301 can refer to the sending of location information of all of computer devices of all registered users of manager system 110. Location data can be provided e.g. by GPS location data or a wireless network location services generated location data e.g. cellular service based or IEEE 802.11 based location data where network service location data is provided by network provided locating services, location data can be sent to the various computer devices of the network, which location data which can be sent by computer devices 130A-130Z as indicated by block 1301. In another embodiment, depicted in FIG. 6, network devices other than computer devices 130A-130Z, can send location data specifying the locations of computer devices 130A-130Z to manager system 110 for receipt by manager system 110 at receive block 1101. On receipt of location data at block 1101, manager system 110 at block 1102 can send location data for storage into data repository 112 at block 1121. Manager system 110 can compare location data for users in reference to instantiated geofences that are active and for each geofence for which there is a record in area 2121, manager system 110 can store in time records area 2122 a history of time records for the geofence. Each time record in area time records area 2122 can specify all users and coordinate locations for all users within a specific geofence at a specific point in time. At block 1103, manager system 110 can perform geofence determining to determine a count of users in each of several geofences that are currently instantiated by manager system 110. For example, referring to FIG. 4, manager system 110 may have instantiated inner and outer area geofences 402 and 408 at each of locations A, B, and C. Accordingly, at block 1103 in one embodiment, manager system 110 can count the number of users at the outer and inner area geofences 402 and 408 at location A, B, and C. In one embodiment, manager system 110 can use different locating technologies to determine a count of users within the different geofences i.e the outer area geofence 402 and inner area geofence 408. For determining (a) a count of users within outer area geofence 402 and external to inner area geofence 408, manager system 110 can selectively examine data provided by GPS data output by computer devices 130A-130Z and/or data output by a location service that processes radio signals received from computer devices 130A-130Z by connection nodes 156 which can be connection nodes of a first radio communication technology e.g. connection nodes of a cellular network radio communication technology. For determining (b) a count of users within inner area geofence 408 e.g. within a venue 122 defined by venue geographical border 124 (FIG. 1), manager system 110 can selectively examine data provided by a location service that processes radio communication signals received by connection nodes 126 which can be connection nodes of a second radio communication protocol e.g. can be connection calls of an IEEE 802.11 wireless local area WIFI network. For determining a count of users within outer area geofence 402 manager system 110 can sum the counts (a) and (b) herein.

At block 1104, manager system 110 can perform various machine learning processes in accordance with machine learning process 211 for adjusting current processes performed by manager system 110. For example, as set forth herein in greater detail later herein, manager system 110 can perform examining of predicted locations of users according to prior predictions of manager system 110 in reference to the actual locations of those users according to the location data received at block 1101. Based on such examining of predicted data in reference to received data, manager system 110 can adjust predicting process 117 run by manager system 110.

Responsive to the geofence determining at block 1103, manager system 110 can proceed to block 1105 to initiate performing filtering users as qualified users of the in geofence users to select certain users of the in geofence users as designated recipients of a notification. Filtering at blocks 1105-1108 can include examining location of in geofence users, demographics information of in geofence users and/or can include predicting that users within an instantiated geofence will undertake a defined activity.

In one embodiment the defined activity can be specified in the notification. In one embodiment, manager system 110 can employ Equation 1 for the performance of predicting, initiated at block 1105 and for performance of predicting manager system 110 can make multiple data requests for data stored in data repository 112. Such data requests in return data of data repository 112 are indicated by send block 1106 by manager system 110 for requesting data of data repository 112 as received by data repository 112 at block 1122 and responded to by data repository 112 at send block 1123 to send requested data to manager system 110 for receipt by manager system 110 at block 1107.

As indicated by Equation 1, manager system 110 performing predicting can include determining the probability of a user being prompted by a notification to perform a targeted activity according to a first factor F1 provided by a motion factor of the user, and various behavior history factors F2-F4. For determining the probability of a user responding to a notification according to a motion factor, manager system 110 can examine data of geofence area 2121, and specifically time records area 2122 for a specific geofence to track motion of a user over time. Manager system 110 can examine location data of a user over time. Manager system 110 can track the motion pattern e.g. a set of directions that the user travels in and can also, using time records of time records area 2122 track the speed of a user, e.g. through an area external to inner area geofence 408 and within an area of outer area geofence 402. Manager system 110 in one embodiment can activate a classifier to classify exhibited motion of the user into one or more motion profile classification. A motion profile can include one or more motion pattern parameter and/or one or more speed parameter. Example motion profile classifications can include classifications as set forth in Table A.

TABLE A

Example Motion Profile Classifications

| Motion Profile Classification | Characteristics |
| --- | --- |
| 1 ("dwelling") | Non-unidirectional motion pattern, moderate speed below high threshold |
| 2 ("to venue") | Unidirectional in a direction of inner area geofence 408 |
| 3 ("exiting") | Unidirectional not in a direction of inner area geofence, speed above a high threshold |

In one embodiment, manager system 110 can assign higher probability values to users exhibiting motion profiles according to Classification 1 ("dwelling") that are non-unidirectional and which are of moderate speed e.g. are speeds below a threshold. Manager system 110 in one embodiment can assign lower probability scores under the motion factor "F1" where a user according to Classification 2 ("to venue") is exhibiting the pattern of heading directly to the area of inner area geofence 408, this could indicate that the user will not be influenced by the notification but rather has already made the decision to travel to the inner area geofence 408, irrespective of whether the notification is received. Manager system 110 can assign lower probability scores to users who according to Classification 3 ("exiting") exhibit unidirectional motion patterns that are not in the direction of inner area geofence 408 and which are at speeds above a speed threshold, which can therefore indicate that a user is in a hurry to exit an area external to inner area geofence 408 and within outer area geofence 402 without visiting inner area geofence 408.

For probability factors "F2-F4" manager system 110 can examine records of shopping history area 2124, purchase history area 2125, and survey history area 2126 respectively. Manager system 110 in one embodiment for determining probabilities according to factors "F2-F4," can activate matching process 119 to identify matches between topics of user behavior history records and topics of a notification for outputting.

As set forth herein, NLP process 113 can have previously processed enterprise messages for populating data records into areas 2124, 2125, 2126. As part of populating such data records, manager system 110 can have classified messages into topics and can have tagged instantiated data records stored in area 2123 to include various topic classifications. Also, manager system 110 can subject a current notification for sending for extracting the topic classification of the message. According to factor "F2" of Equation 1, manager system 110 can base a probability according to factor F2 on data of shopping history records stored in shopping history area 2124. In one embodiment, manager system 110 can assign higher probabilities of being influenced by a notification to perform a targeted action to users having topic classifications matching the classification of the current notification for sending according to a matching criteria. For factor "F2" of Equation 1, which can be based on data of purchase history area 2125, manager system 110 can assign higher probabilities associated with being prompted with a notification message in cases where shopping history area 2124 for the user includes more than a threshold percentage of records having topic classifications matching the classification of a current notification for sending based on a matching criteria. Likewise, for factor "F3" of Equation 1, which can be based on data of purchase history area 2125, manager system 110 can assign higher probabilities associated with being prompted with a notification message in cases where purchase history area 2125 for the user includes more than a threshold percentage of records having topic classifications matching the classification of a current notification for sending based on a matching criteria. For factor "F4" of Equation 1, which can be based on data of survey history area 2126, manager system 110 can assign higher probabilities according to factor "F4" where survey history area 2126 includes more than a threshold percentage of records having topic classifications that match a current classification of a current notification for sending.

At blocks 1105-1108 corresponding to block 310 (FIG. 3), manager system 110 for performing filtering can perform predicting of in-geofence users i.e. users within outer area geofence 402, will perform a defined targeted activity in response to receipt of notification and sending the notification to certain users based on the predicting. In one embodiment, manager system 110 at block 310 can perform predicting to predict such notifications will actually be successful in directing users to move from locations external to inner area geofence 408 and within outer area geofence 402 to areas within geofence 408. For performance of such predicting manager system 110 at block 310 can perform filtering by performing predicting based on multiple factors and can combine the factors for the sum of weighted factors.

At block 1108, manager system 110 can determine whether filtering is complete. In one embodiment, at blocks 1105-1108 manager system 110 can perform filtering by performing predicting with respect to each user currently within an area of a geofence e.g. outer area geofence 402 at location A as depicted in FIG. 4. Predicting can be regarded to be complete at block 1108 when a probability of a user being influenced by a notification for sending has been determined for each user within outer area geofence 402. With the probability being compared to a threshold for establishing of a predicting, manager system 110 can predict that an occurrence will result based on probability exceeding a threshold e.g. 60% probability, 80% probability, 90% probability. Various thresholds for establishing a predicting can be selected. At block 1108, manager system 110 can determine whether a notification process, e.g. to a promotional campaign has been triggered. In one embodiment, manager system 110 can determine that a notification process has been triggered based on comparing a count of qualified users within a geofence to a threshold. The threshold can be a low threshold or a high threshold.

At block 1109, manager system 110 can determine if a notification sending process has been triggered. As set forth herein, triggering the notification sending process can be based on various geofence user counts. For example, in one embodiment a notification sending process can be made active based on a determining that a count of users within in an outer area geofence 402 exceeds a threshold (a low threshold) and/or is less than a threshold (a high threshold). Making active a notification sending process can be based further on determining that a count of users in an inner area geofence 408 is below a threshold.

At block 1110, manager system 110 can perform outputting a notification. Outputting of a notification can include e.g. outputting a text based message promoting an article for purchase to prompt a user to move into an area of inner area geofence 408.

Outputting a notification at block 1110 can include selectively outputting a notification to a subset of users of manager system 110. As set forth herein users subject to filtering at blocks 1105-1108 can be restricted to users determined to be within a geofence such as geofence 402. Further by the filtering at block 1105-1108 a subset of users within an area of a geofence 402 can be users satisfying certain qualifying location based criteria, users satisfying certain qualifying demographic based criteria, and/or users predicted to react and be prompted in a targeted way by a notification. Accordingly, manager system 110 can automatically and dynamically manage and can "throttle" sending of notifications, thus dynamically reducing demands on resources of manager system 110 and improving an ability of manager system 110 to maintain ongoing services. In one embodiment outputting of a notification at block 1110 can be selective to those users within outer area geofence 402 predicted at blocks 1105-1108 to be prompted by the notification. Further, it is noted that predicting processes as set forth in blocks 1105-1108 can be performed with respect to only a subset of users of system 100, namely only users within an area of a geofence and triggering a notification sending process at block 1105. Outputting a notification M001, only to a subset of users within an area of a geofence, manager system 110 can avoid sending notifications that are not likely to have an effect and/or which can be distracting to users, causing disengagement of a user from user interface component of manager system 110.

Manager system 110 at block 1111 can determine whether a disabling criteria has been satisfied. Based on a determination that a disabling criteria has occurred, manager system 110 can proceed to block 1112 to disable a notification sending process. Otherwise, manager system 110 can return to block 1116 and initiate a next iteration of predicting. According to a running of a notification process 116 notifications can be output iteratively by manager system 110, e.g. on an N notification at a time basis (N>/=1) until a disabling criteria is satisfied.

A disabling criteria can be satisfied e.g. is a count of users within inner area geofence 408 exceeds a threshold. A count above a threshold can indicate e.g. that a retail venue 122 (FIG. 1) has filled up and thus a goal of a notification sending process has been satisfied. Another disabling criteria that can be examined at block 1111 is whether the count requirement for outer area geofence 402 (e.g. determined by comparison to one or more threshold) continues to be satisfied. In one embodiment, predicting processes performed by the predicting at blocks 1105-1108 can be iteratively updated e.g. by processes of machine learning block 1104. As highlighted herein, blocks 1101-1105 can be performed on an ongoing basis and continue ongoing after manager system 110 branches to block 1106.

On performing of disabling at block 1112, manager system 110 can proceed to block 1113. At block 1113, manager system 110 can return to block 1101. According to machine learning block 1104, manager system 110 can examine a prior predicting of a user travelling to an inner area geofence 408 with reference to an actual result e.g. whether the user in fact, according to the prediction to travel to the retail venue at inner area geofence 408. Manager system 110 in data repository 112 can store a record of weight profiles for the weights "W1-W4," manager system 110 can store in a positive results area of data repository 112 weights associated with iterations of Equation 1 yielding predictions that were proved by data examination to be correct and can store in negative results area of data repository 112 profiles e.g. weights e.g. the values of weights "W1-W4," used for iterations of Equation 1 yielding predictions that proved by examination of location data by manager system 110 to be incorrect. During iterations of use of Equation 1 for performance of filtering by predicting at block 1105-1108, manager system 110 can examine weight profiles of the positive results are and the negative results area of data repository 112. Manager system 110 can bias weights of Equation 1 in favor of weight stored in the positive results area and can bias weights of Equation 1 away from weight values stored in the negative results area. In such manner, predicting performed by manager system 110 can grow accurate over time based on an automated machine process that uses examination of data to adjust predicting processes without reliance on any rules based criteria. In one embodiment, manager system 110 in accordance with machine learning block 1104 can examine data such as current data of geofence 402 and geofence 408 at a certain location, e.g. location A to determine whether a user previously predicted to breach inner area geofence 408 from an area external to inner area geofence 408 and within outer area geofence 408 actually breached inner area geofence 408 or did not breach geofence 408 (which can be indicated by the user moving to a location outwardly from outer perimeter 404). Manager system 110 at block 1104 by examining data of geofence 402 and geofence 408 with respect to users to whom notifications have been output can determine if a prior predicting was successful. If a user predicted to breach geofence 408 and receiving a notification is determined to have breached inner area geofence 408, manager system 110 can record a successful result. If a user predicted to breach geofence 408 and receiving a notification is determined to have not breached inner area geofence 408, manager system 110 can record an unsuccessful result.

Referring again to Equation 1 manager system 110 can store weight profiles e.g. the set of weight values "W1-W4" yielding successful results in a successful results area 2128 of data repository 112 and can store weight profiles yielding unsuccessful results in an unsuccessful results area 2129 of data repository 112. During each iteration of manager system 110 using Equation 1, manager system 110 can adjust the values of the weights of "W1-W4" based on updated weight profiles information stored in successful results area 2128 and the unsuccessful results area 2129 of data repository 112. Manager system 110 can bias weights of Equation 1 during each iteration in favor of weights (e.g. having a threshold similarity level according to a similarity criteria) producing successful results and away from weights (e.g. having a threshold dissimilarity level according to a dissimilarity criteria) producing unsuccessful results. In such manner, an accuracy of probability determination is performed by manager system 110 can increase over time based on examining of data by manager system 110 on an automatic basis i.e. independent of user input data input via a manually operated user interface. Use of machine learning processes as set forth in reference to block 1104 can enhance accuracy while reducing reliance on rules based criteria for decision making and thus can provide for reductions in computational overhead. During performance of iterations of prioritization determinations using Equation 1 manager system 110 can vary weights W1-W4 within valid ranges in a manner so that the weights are not predetermined but rather are subject to optimization through machine learning processes as set forth herein in accordance with machine learning process 211 (FIG. 1).

Certain embodiments herein may offer various technical computing advantages, involving computing advantages to address problems arising in the realm of computer networks and particularly computer networks operating to provide services to a plurality of users capable of communicating with the network. In one aspect, on the occurrence of events commonly experienced by multiple users at a common time, the multiple users may make concurrent demands on the network to overload the network and frustrate the function of relied on services. In accordance with that aspect embodiments herein can intelligently reduce potential network loading events by intelligent management of notifications to users. Embodiments herein can also address traffic flow concerns for example by reducing a risk that users will collide or bottleneck within certain areas within or about a venue on receipt of a notification. By intelligent outputting of notifications embodiments herein can impact venue and venue area traffic patterns in positive ways by reduction of health risks, safety risk, and by increasing traffic flow support under the constraint of a certain infrastructure venue layout design. Embodiments herein can dynamically adjust or "throttle" notifications output to in venue users to reduce network overloading risk while at the same time addressing concerns of in venue traffic congestion. Embodiments herein further can feature automated user interface functionally wherein outputs can be automatically triggered in response to sensed action by a user independent of any input into a manually operated user interface. For example, processing of radio signals can be performed to automatically sense a user's location and based on a sensed location of a user a notification can be output to the user. Machine learning processes can be performed for increased accuracy and for reduction of reliance on rules based criteria and thus reduced computational overhead. In one embodiment, a data repository can be leveraged which can be populated and managed by multiple processes including proactive data populating process invoking automated search engines searching of multiple data sources. For enhancement of computational accuracies, embodiments can feature computational platforms existing only in the realm of computer networks such as artificial intelligence platforms, and machine learning platforms. Embodiments herein can employ data structuring processes, e.g. employing Natural Language Processing (NLP) for transforming unstructured data into a form optimized for computerized processing. Embodiments herein can provide results and advantages that are not possible or practical without use of components of a technical computing environment, such as processes leveraging instantaneous queries of a data repository storing user behavior history data to develop multifactor probability determinations. Embodiments herein can examine data from diverse data sources such as data sources that process radio signals for location determination of users. Embodiments herein according to one artificial intelligence platform can, in order to drive cognitive decision making, examine location data and classify exhibited motion of a user into one of a plurality of candidate motion related classifications. Embodiments herein can include artificial intelligence processing platforms featuring improved processes to transform unstructured data into structured form permitting computer based analytics and predictive decision making. Embodiments herein can include particular arrangements for both collecting rich data into a data repository and additional particular arrangements for updating such data and for use of that data to drive artificial intelligence decision making.

Figure 7:
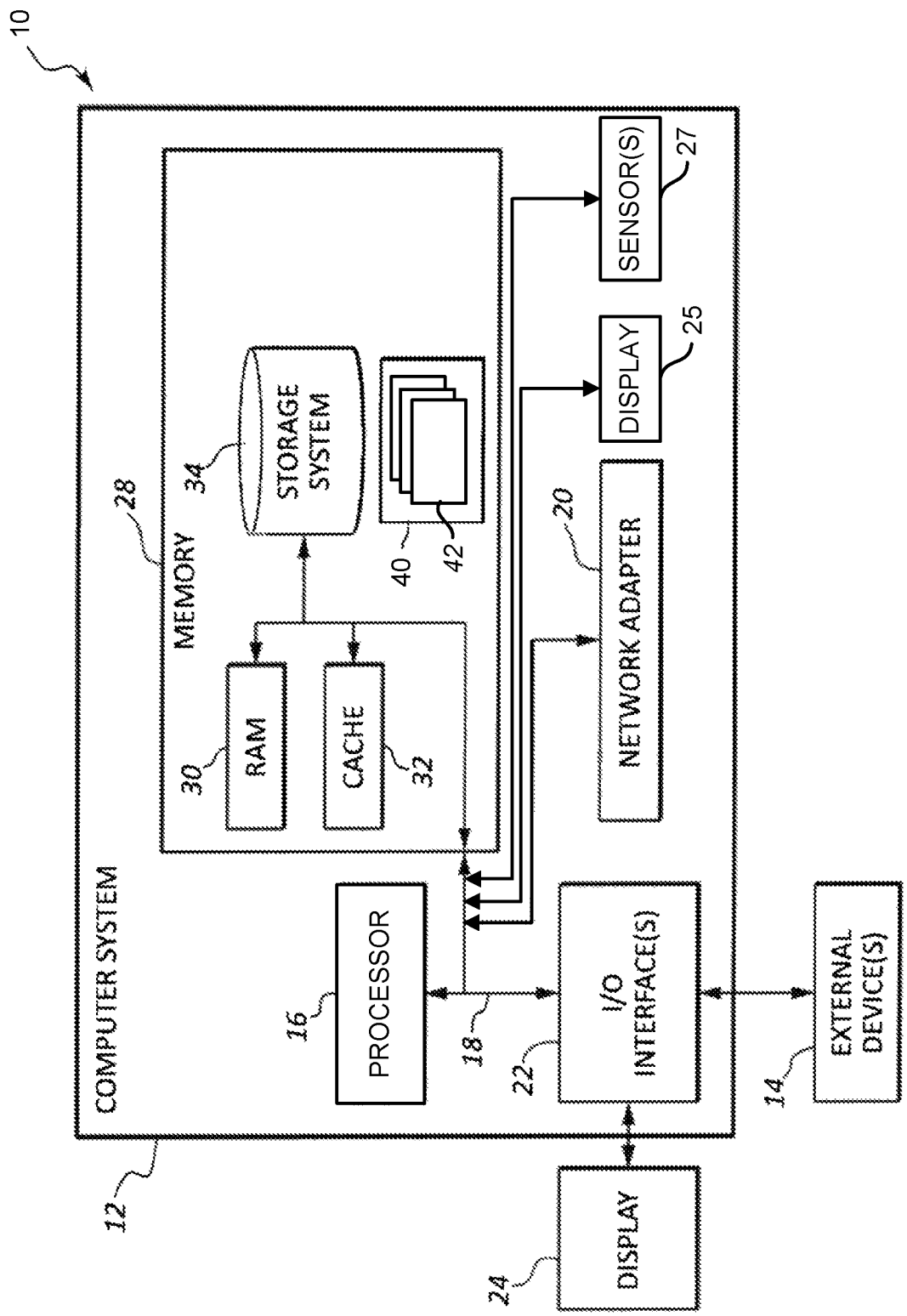
FIG. 7 depicts a computing node according to one embodiment.
Figure 8:
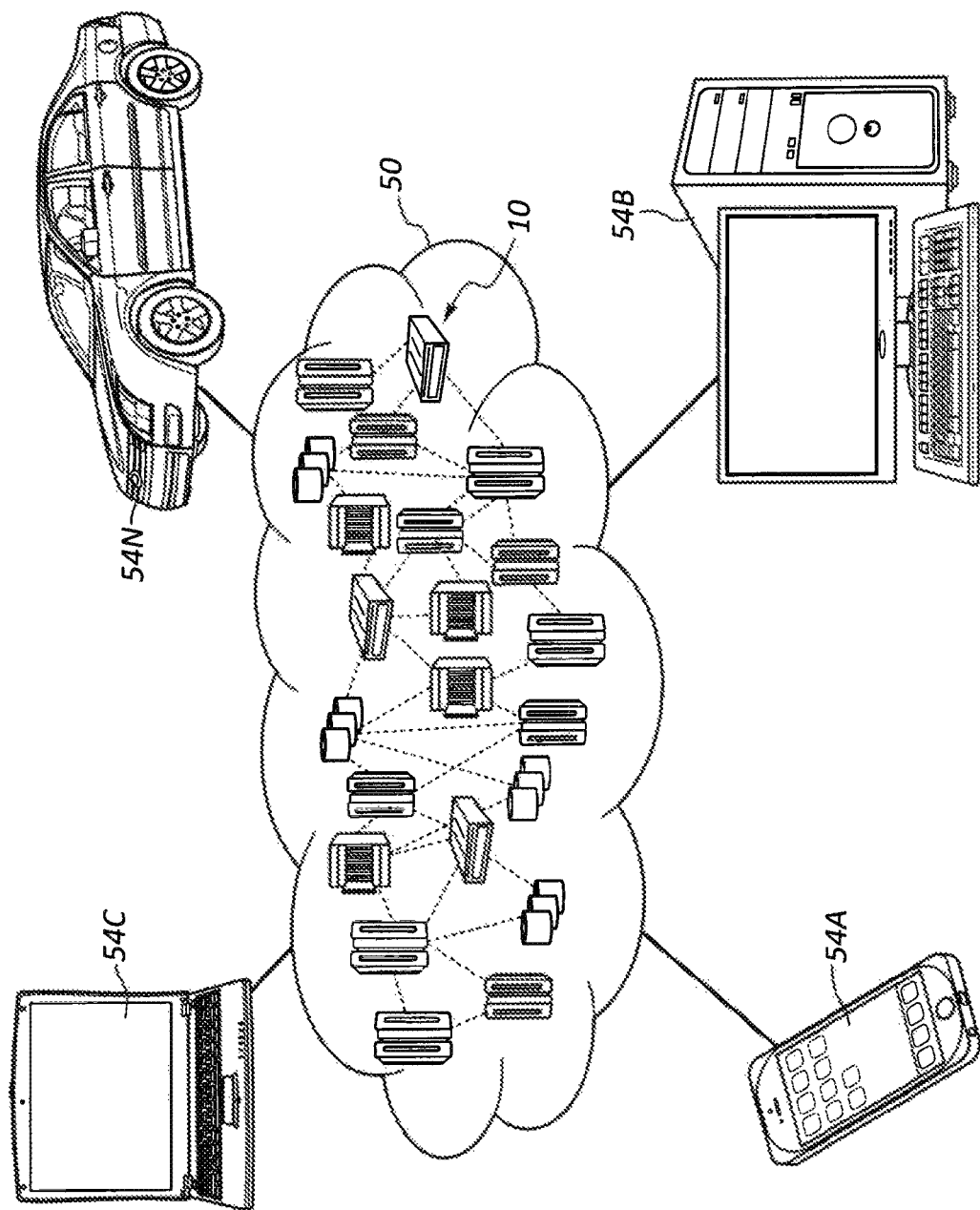
FIG. 8 depicts a cloud computing environment according to one embodiment.
Figure 9:
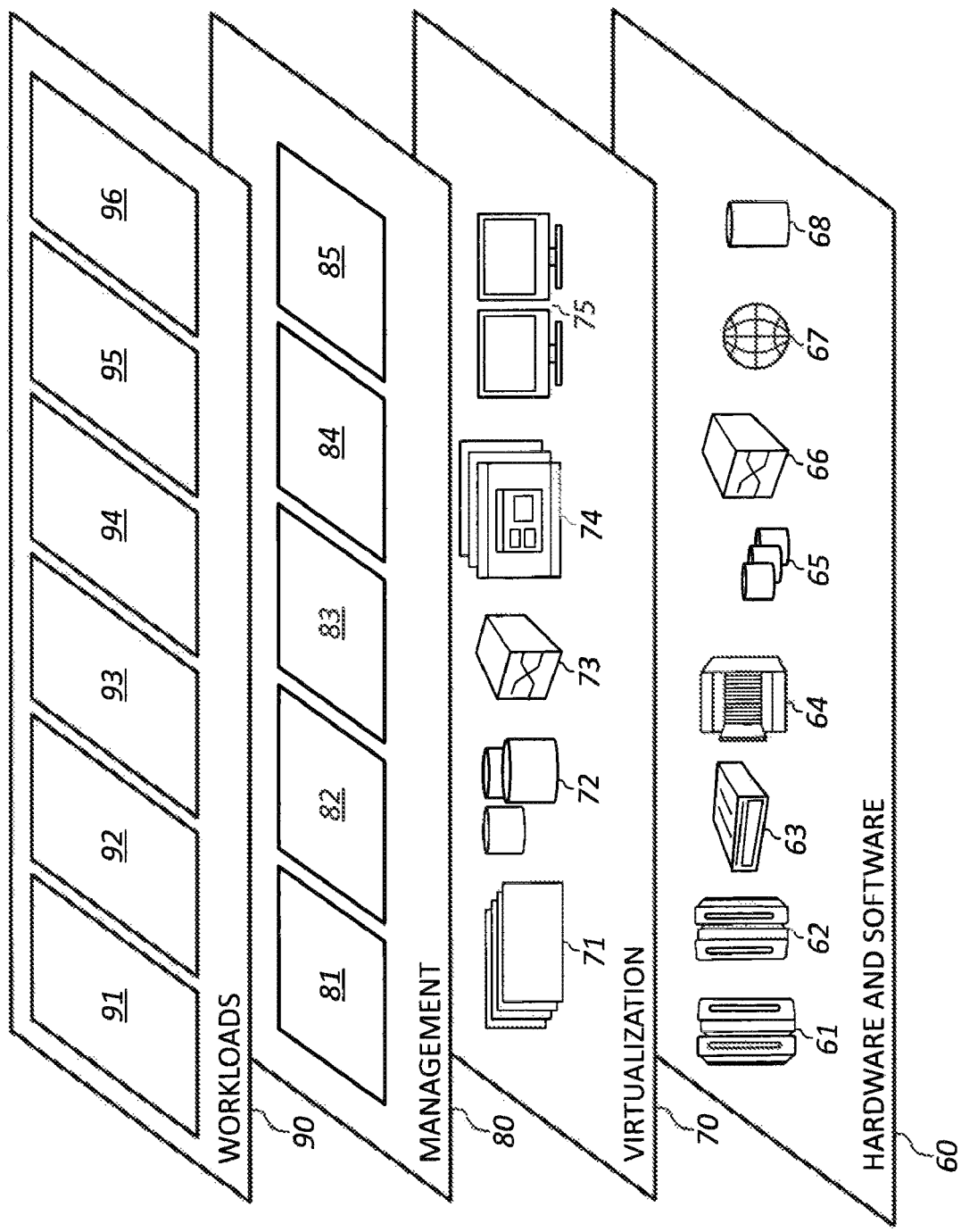
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 3 and functions described with reference to method 300 of FIG. 3 and functions described with reference to manager system 110 as set forth in the flowchart of FIG. 6. In one embodiment, one or more user computer device 130A-130Z can include one or more computing node 10 and can include one or more program 40 for performing functions described with reference to one or more user computer device 130A-130Z as set forth in the flowchart of FIG. 6.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for cognitive outputting of notifications as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   filtering in geofence users within an area of a geofence to determine a count of qualified in geofence users within an area of a geofence, wherein the filtering in geofence users includes identifying candidate in geofence users within the geofence, and for respective ones of the candidate in geofence users running a process for identifying qualified in geofence users from the candidate users, wherein the identifying the qualified in geofence users includes examining for respective ones of the candidate in geofence users (a) an historical behavior of the candidate in geofence user, (b) a location of the candidate in geofence user, (c) a motion characteristic of the candidate in geofence user;
   comparing the count of qualified in geofence users within an area of a geofence to a threshold and activating a notification sending process based on a result of the comparing, wherein the comparing the count of qualified in geofence users includes comparing the count of qualified in geofence users to a low threshold and comparing the count of qualified in geofence users to a high threshold and performing the activating based on the count of qualified in geofence users currently within the geofence exceeding the low threshold and being less than the high threshold;
   in response to the activating of the sending process, selectively transmitting the notification to the qualified in geofence users so that running of the sending process results in the notification being sent selectively to a subset of the candidate in geofence users who are the qualified in geofence users but not users of the candidate in geofence users who are not the qualified in geofence users;
   disabling the notification sending process based on a disabling criteria being satisfied; and
   iteratively performing the filtering, the comparing and the selectively transmitting to dynamically throttle content transmissions by a system, thus dynamically reducing demands on resources of the system.

2. The method of claim 1, wherein the comparing a count of in geofence users includes comparing the count to a low threshold and performing the activating based on the low threshold being exceeded.

3. The method of claim 1, wherein the comparing a count of in geofence users includes comparing the count to a high threshold and performing the activating based on the count being less than the high threshold.

4. The method of claim 1, wherein the comparing a count of in geofence users includes comparing the count to a low threshold and comparing the count to a high threshold and performing the activating based on the count exceeding the low threshold and being less than the high threshold.

5. The method of claim 1, wherein the filtering includes examining in geofence users according to a location based criteria and determining that an in geofence user is a qualified in geofence user qualified to receive a notification based on the location based criteria being satisfied, the location based criteria being the criteria that the user is within the area of the geofence but not within an area of a second geofence.

6. The method of claim 1, wherein the filtering includes qualifying in geofence users according to a demographic based criteria and qualifying an in geofence user as a qualified in geofence user to receive a notification based on the demographic criteria by satisfying the geofence defines an area larger than an area encompassing a venue.

7. The method of claim 1, wherein the filtering includes predicting that certain users of the in geofence users will perform a defined activity in response to receipt of a notification, wherein the predicting includes activating a classifier to classify exhibited motion of users within an area of the geofence into one or more motion classifier, the motion classifier having a motion pattern parameter and a speed of motion parameter.

8. The method of claim 1, wherein the filtering includes predicting that certain users of the in geofence users will perform a defined activity in response to receipt of a notification, wherein the predicting is based on a matching factor, wherein matching according to a matching factor includes comparing topics behavior records to a user with a topic of the notification.

9. The method of claim 1, wherein the filtering includes predicting that certain users of the in geofence users will perform a defined activity in response to receipt of a notification, wherein the predicting is based on one or more of the following selected from the group consisting of a motion factor involving examining a pattern of motion of a user and a speed of motion of a user within an area of the geofence and a behavior history factor involving examining a behavior history of a user.

10. The method of claim 1, wherein the filtering includes predicting that certain users of the in geofence users will perform a defined activity in response to receipt of a notification, wherein the predicting is based on a behavior history factor involving examining a behavior history of a user, and wherein the examining includes matching a topic of the notification to a topic of behavior history data records of the user stored in a data repository, wherein determining a topic of the notification includes running a Natural Language Processing (NLP) process to determine a topic classification of the notification, and wherein determining a topic of the behavior history records of the user includes running the NLP process to determine a topic classification for the behavior history records.

11. The method of claim 1, wherein the filtering includes predicting that certain users of the in geofence users will perform a defined activity in response to receipt of a notification, wherein the predicting is based on a motion factor involving running a motion classifier to examine location data of the user over time within an area of the geofence for providing a motion classification that specifies a pattern of motion and a motion speed for the user within an area of the geofence.

12. The method of claim 1, wherein the filtering includes predicting that certain users of the in geofence users will perform a defined activity in response to receipt of a notification, wherein the predicting is based on a motion factor involving running a motion classifier to examine location data of the user over time within an area of the geofence for providing a motion classification that specifies a pattern of motion for the user within the geofence, wherein the method includes running the motion classifier to classify a first user according to a "dwelling" motion profile classification, and running the motion classifier to classify a second user according to an "exiting" motion profile classification, wherein the method further includes assigning for the motion factor to the first user a relatively higher probability of reacting in a targeted way to receipt of the notification, and assigning for the motion factor to the second user a relatively lower probability of reacting in a targeted way to receipt of the notification.

13. The method of claim 1, wherein the method includes performing a machine learning process to perform examining of results providing by predicting and adjusting the predicting based on the examining.

14. The method of claim 1, wherein the filtering includes predicting that certain users of the in geofence users will perform a defined activity in response to receipt of a notification, wherein the predicting includes determining a probability of users of the in geofence users reacting in a targeted way in response to receipt of the notification, wherein the determining includes applying a function that combines weighted factors, and wherein the method includes performing a machine learning process to perform examining of results providing by the determining and adjusting the determining based on the examining, the adjusting including adjusting weights of the weighted factors.

15. The method of claim 1, wherein the filtering includes predicting that certain users of the in geofence users will perform a defined activity in response to receipt of a notification, wherein the predicting includes determining a probability of users of the in geofence users reacting in a targeted way in response to receipt of the notification, wherein the determining a probability includes applying the function $P=W1F1+W2F2+W3F3+W4F4$, wherein F1 is a motion factor involving examining a pattern of motion of the user within the geofence, F2 is a shopping history factor involving examining a shopping history pattern of the user, F3 is a purchase history factor involving examining a purchase history of the user, and F4 is a survey history factor involving examining of a survey history of the user.

16. The method of claim 1, wherein the filtering includes predicting that certain users of the in geofence users will perform a defined activity in response to receipt of a notification, wherein the predicting includes determining a probability of users of the in geofence users reacting in a targeted way in response to receipt of the notification, wherein the determining a probability includes applying the function $P=W1F1+W2F2+W3F3+W4F4$, wherein F1 is a motion factor involving examining a pattern of motion of the user within the geofence, F2 is a shopping history factor involving examining a shopping history pattern of the user, F3 is a purchase history factor involving examining a purchase history of the user, and F4 is a survey history factor involving examining of a survey history of the user, wherein the method includes performing a machine learning process to automatically perform examining of results provided by the determining to store weight profiles specifying values of the weights W1-W4 yielding successful results in a successful results area of a data repository and to store weight profiles specifying values of the weights W1-W4 yielding unsuccessful results in an unsuccessful results area of a data repository, and automatically adjusting the determining based on the examining, the adjusting including biasing weights W1-W4 for use in the performing of the determining in favor of weight profiles of the successful results area and away from weight profiles of the unsuccessful results area, wherein the predicting based on factors F2, F3, and F4 involves examining a behavior history of a user, and wherein the examining a behavior history includes matching a topic of the notification to a topic of behavior history data records of the user stored in a data repository, wherein determining a topic of the notification includes running a Natural Language Processing (NLP) process to determine a topic classification of the notification, and wherein determining a topic of the behavior history records of the user includes running the NLP process to determine a topic classification for the behavior history records, and wherein the disabling includes one or more of the following selected from the group consisting of (a) deactivating the notification sending process and (b) restricting the sending.

17. The method of claim 1, wherein the filtering includes examining in geofence users according to a location based criteria and determining that an in geofence user is a qualified in geofence user qualified to receive a notification based on the location based criteria being satisfied, the location based criteria being the criteria that the user is within the area of the geofence but not within an area of a second geofence so that users within the area of the second geofence are excluded from receiving the notification, wherein a perimeter of the second geofence is entirely within a perimeter of the geofence, and wherein the notification is a notification that prompts the qualified users to move from their location external from the second geofence into and within an area of the second geofence, and wherein the filtering in geofence users includes examining location data obtained from GPS sensors of mobile client computer device of the in geofence users.

18. The method of claim 1, wherein the filtering includes examining in geofence users according to a location based criteria and determining that an in geofence user is a qualified in geofence user qualified to receive a notification based on the location based criteria being satisfied, the location based criteria being the criteria that the user is within the area of the geofence but not within an area of a second geofence so that users within the area of the second geofence are excluded from receiving the notification, wherein a perimeter of the second geofence is entirely within a perimeter of the geofence, and wherein the notification is a notification that prompts the qualified users to move from their location external from the second geofence into and within an area of the second geofence, and wherein the filtering in geofence users includes examining location data obtained from GPS sensors of mobile client computer device of the in geofence users, wherein the filtering includes predicting that certain users of the in geofence users will react in a targeted way to travel to within the area of the second geofence in response to receipt of the notification, wherein the predicting is based on a motion factor involving running a motion classifier to examine GPS based location data of the certain users over time within an area of the geofence for providing a motion classification that specifies a pattern of motion for the certain users within the geofence, wherein the method includes running the motion classifier to classify a first user of the certain users according to a "dwelling" motion profile classification, running the motion classifier to classify a second user of the certain users according to "to venue" motion profile classification, and running the motion classifier to classify a third user of the certain users according to an "exiting" motion profile classification, wherein the method further includes assigning for the motion factor to the first user a relatively higher probability of reacting in the targeted way to receipt of the notification, assigning for the motion factor to the second user a relatively lower probability of reacting in the targeted way to receipt of the notification, and assigning for the motion factor to the third user a relatively lower probability of reacting in a targeted way to receipt of the notification, wherein the "dwelling" motion profile classification results from pattern of motion of the first user characterized by the first user moving non-unidirectionally at a moderate speed below a threshold, wherein the "to venue" motion profile classification results from pattern of motion of the second user characterized by the second user moving unidirectionally in a direction toward the second geofence, wherein the "exiting" motion profile classification results from pattern of motion of the third user characterized by the third user moving unidirectionally at a speed above a threshold in a direction other than in a direction of the second geofence.

19. A system comprising:
  a memory;
  at least one processor in communication with the memory; and
  program instructions executable by one or more processor via the memory to perform a method comprising:
    filtering in geofence users within an area of a geofence to determine a count of qualified in geofence users within an area of a geofence, wherein the filtering in geofence users includes identifying candidate in geofence users within the geofence, and for respective ones of the candidate in geofence users running a process for identifying qualified in geofence users from the candidate users, wherein the identifying the qualified in geofence users includes examining for respective ones of the candidate in geofence users (a) an historical behavior of the candidate in geofence user, (b) a location of the candidate in geofence user, (c) a motion characteristic of the candidate in geofence user;
    comparing the count of qualified in geofence users within an area of a geofence to a threshold and activating a notification sending process based on a result of the comparing, wherein the comparing the count of qualified in geofence users includes comparing the count of qualified in geofence users to a low threshold and comparing the count of qualified in geofence users to a high threshold and performing the activating based on the count of qualified in geofence users currently within the geofence exceeding the low threshold and being less than the high threshold;
    in response to the activating of the sending process, selectively transmitting the notification to the qualified in geofence users so that running of the sending process results in the notification being sent selectively to a subset of the candidate in geofence users who are the qualified in geofence users but not users of the candidate in geofence users who are not the qualified in geofence users;
    disabling the notification sending process based on a disabling criteria being satisfied; and
    iteratively performing the filtering, the comparing and the selectively transmitting to dynamically throttle content transmissions by the system, thus dynamically reducing demands on resources of the system.

20. The system of claim 19, wherein the filtering includes predicting that certain candidate in geofence users of the in geofence users will perform a defined activity in response to receipt of the notification, wherein the notification is custom configured by an administrator user, wherein the predicting is based on a behavior history factor involving examining a behavior history of respective ones of the candidate in geofence users, wherein the examining a behavior history of respective ones of the candidate in geofence users includes examining behavior history records of a data repository which stores behavior history data records for the respective ones of the candidate in geofence users, wherein the behavior history data records include browsing history activity records for the respective ones of the candidate in geofence users, and wherein the examining includes matching in response to the administrator user custom configuring the notification, a topic of the notification to a topic of behavior history data records of a plurality of candidate in geofence users of the respective ones of the candidate in geofence users stored in the data repository, wherein determining a topic of the notification includes running a text based Natural Language Processing (NLP) process to determine a topic classification of the notification, and wherein determining a topic of the behavior history records of the respective one of the candidate in geofence users includes running a text based NLP process to determine a topic classification for the behavior history records, wherein the filtering includes examining respective ones of the candidate in geofence users according to a location based criteria and determining that a candidate in geofence user is a qualified in geofence user qualified to receive a notification based on the location based criteria being satisfied, the location based criteria being the criteria that the user is within the area of the geofence but not within an area of a second geofence so that users within the area of the second geofence are excluded from receiving the notification, wherein a perimeter of the second geofence is entirely within a perimeter of the geofence, and wherein the notification is a notification that prompts the qualified in geofence users to move from their location external from the second geofence into and within an area of the second geofence, and wherein the filtering in geofence users includes examining location data obtained from GPS sensors of mobile client computer device of the candidate in geofence users, wherein the filtering includes predicting that respective ones of the candidate in geofence user will react in a targeted way to travel to within the area of the second geofence in response to receipt of the notification, wherein the predicting is based on a motion factor involving miming a motion classifier to examine GPS based location data of the respective ones of the candidate in geofence user over time within an area of the geofence for providing a motion classification that specifies a pattern of motion for the certain users within the geofence, wherein the method includes running the motion classifier to classify a first user of the respective ones of the candidate in geofence user according to a "dwelling" motion profile classification, running the motion classifier to classify a second user of the respective ones of the candidate in geofence user according to "to venue" motion profile classification, and running the motion classifier to classify a third user of the respective ones of the candidate in geofence user according to an "exiting" motion profile classification, wherein the method further includes assigning for the motion factor to the first user a relatively higher probability of reacting in the targeted way to receipt of the notification, assigning for the motion factor to the second user a relatively lower probability of reacting in the targeted way to receipt of the notification, and assigning for the motion factor to the third user a relatively lower probability of reacting in a targeted way to receipt of the notification, wherein the "dwelling" motion profile classification results from pattern of motion of the first user characterized by the first user moving non-unidirectionally within an area between the geofence and the second geofence at a moderate speed below a threshold, wherein the "to venue" motion profile classification results from pattern of motion of the second user characterized by the second user moving unidirectionally in a direction toward the second geofence, wherein the "exiting" motion profile classification results from pattern of motion of the third user characterized by the third user moving unidirectionally at a speed above a threshold in a direction other than in a direction of the second geofence.

21. The system of claim 19, wherein the filtering includes predicting that certain candidate in geofence users of the in geofence users will perform a defined activity in response to receipt of the notification, wherein the predicting is based on a behavior history factor involving examining a behavior history of respective ones of the candidate in geofence users, wherein the examining a behavior history of respective ones of the candidate in geofence users includes examining behavior history records of a data repository which stores behavior history data records for the respective ones of the candidate in geofence users, wherein the behavior history data records include online browsing history activity records for the respective ones of the candidate in geofence users and in venue browsing history activity records for the respective ones of the candidate in geofence users and in venue item acquisition activity history records for the respective ones of the candidate in geofence users and completed survey history records for the respective ones of the candidate in geofence users, and wherein the examining includes matching a topic of the notification to a topic of behavior history data records of a plurality of candidate in geofence users of the respective ones of the candidate in geofence users stored in the data repository to identify the plurality of candidate in geofence users as users of the qualified in geofence users, wherein determining a topic of the notification includes running a text based Natural Language Processing (NLP) process to determine a topic classification of the notification, and wherein determining a topic of the behavior history records of the respective ones of the candidate in geofence users includes running a text based NLP process to determine a topic classification for the behavior history records, wherein the determining a topic of the behavior history records of the respective ones of the candidate in geofence users includes (a) running a text based NLP process to determine a topic classification for the online browsing history activity records for the respective ones of the candidate in geofence users, (b) running a text based NLP process to determine a topic classification for in venue browsing history activity records for the respective ones of the candidate in geofence users; (c) running a text based NLP process to determine a topic classification for the in venue item acquisition activity history records for the respective ones of the candidate in geofence users; and (d) running a text based NLP process to determine a topic classification of completed survey history records for the respective ones of the candidate in geofence users.

22. A computer program product comprising:
a computer readable storage medium readable by one or more processing unit and storing instructions for execution by one or more processor for performing a method comprising:
filtering in geofence users within an area of a geofence to determine a count of qualified in geofence users within an area of a geofence, wherein the filtering in geofence users includes identifying candidate in geofence users within the geofence, and for respective ones of the candidate in geofence users running a process for identifying qualified in geofence users from the candidate users, wherein the identifying the qualified in geofence users includes examining for respective ones of the candidate in geofence users (a) an historical behavior of the candidate in geofence user, (b) a location of the candidate in geofence user, (c) a motion characteristic of the candidate in geofence user;
comparing the count of qualified in geofence users within an area of a geofence to a threshold and activating a notification sending process based on a result of the comparing, wherein the comparing the count of qualified in geofence users includes comparing the count of qualified in geofence users to a low threshold and comparing the count of qualified in geofence users to a high threshold and performing the activating based on the count of qualified in geofence users currently within the geofence exceeding the low threshold and being less than the high threshold;

in response to the activating of the sending process, selectively transmitting the notification to the qualified in geofence users so that running of the sending process results in the notification being sent selectively to a subset of the candidate in geofence users who are the qualified in geofence users but not users of the candidate in geofence users who are not the qualified in geofence users;

disabling the notification sending process based on a disabling criteria being satisfied; and iteratively performing the filtering, the comparing and the selectively transmitting to dynamically throttle content transmissions by a system, thus dynamically reducing demands on resources of the system.

* * * * *